United States Patent
Huang

(10) Patent No.: US 8,248,016 B2
(45) Date of Patent: Aug. 21, 2012

(54) FAN CIRCUIT

(75) Inventor: Yong-Zhao Huang, Shenzhen (CN)

(73) Assignees: Hong Fu Jin Precision Industry ( ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 289 days.

(21) Appl. No.: 12/760,445

(22) Filed: Apr. 14, 2010

(65) Prior Publication Data

US 2011/0175562 A1 Jul. 21, 2011

(30) Foreign Application Priority Data

Jan. 20, 2010 (CN) .......................... 2010 1 0300484

(51) Int. Cl.
*H02P 7/29* (2006.01)

(52) U.S. Cl. .................... 318/471; 318/798; 388/811

(58) Field of Classification Search .......... 318/471–472, 318/461, 811, 798, 635; 388/811, 825, 829
See application file for complete search history.

(56) References Cited

U.S. PATENT DOCUMENTS

| | | | | |
|---|---|---|---|---|
| 6,135,718 A * | 10/2000 | Yang | ................................ | 417/22 |
| 6,396,231 B1 * | 5/2002 | Horng et al. | ................... | 318/471 |
| 6,650,074 B1 * | 11/2003 | Vyssotski et al. | ........ | 318/400.12 |
| 6,703,803 B2 * | 3/2004 | Ohiwa et al. | .............. | 318/400.17 |
| 7,394,215 B2 * | 7/2008 | Tsai et al. | ...................... | 318/461 |
| 7,479,753 B1 * | 1/2009 | Mimberg | ....................... | 318/599 |
| 7,646,163 B2 * | 1/2010 | Xi et al. | ......................... | 318/599 |
| 7,702,223 B2 * | 4/2010 | Qian et al. | ....................... | 388/825 |
| 7,742,688 B2 * | 6/2010 | Zou et al. | ....................... | 388/811 |
| 8,055,124 B2 * | 11/2011 | Pan | ................................. | 388/811 |
| 2007/0133955 A1 * | 6/2007 | Hsu et al. | ....................... | 388/811 |
| 2007/0145920 A1 * | 6/2007 | Wu et al. | ........................ | 318/268 |
| 2008/0181586 A1 * | 7/2008 | Fan | .............................. | 388/830 |
| 2010/0127653 A1 * | 5/2010 | Ko et al. | ................... | 318/400.42 |
| 2011/0084632 A1 * | 4/2011 | Ou | ................................. | 318/268 |
| 2012/0060527 A1 * | 3/2012 | Song et al. | ...................... | 62/126 |

* cited by examiner

*Primary Examiner* — Eduardo Colon Santana
(74) *Attorney, Agent, or Firm* — Altis Law Group, Inc.

(57) ABSTRACT

A fan circuit controls a speed of a fan. A control chip outputs a pulse width modulation (PWM) signal that changes with the temperature of an electronic device that the fan is mounted in. An input circuit converts the PWM signal into a continual voltage signal. An amplifier circuit amplifies the voltage signal and outputs a control signal. When the control signal is less than a threshold voltage, the control circuit is turned on and the fan receives current which is less than preset current. When the control signal is greater than the threshold voltage, the control circuit is turned off and the fan receives current which is greater than the preset current.

6 Claims, 1 Drawing Sheet

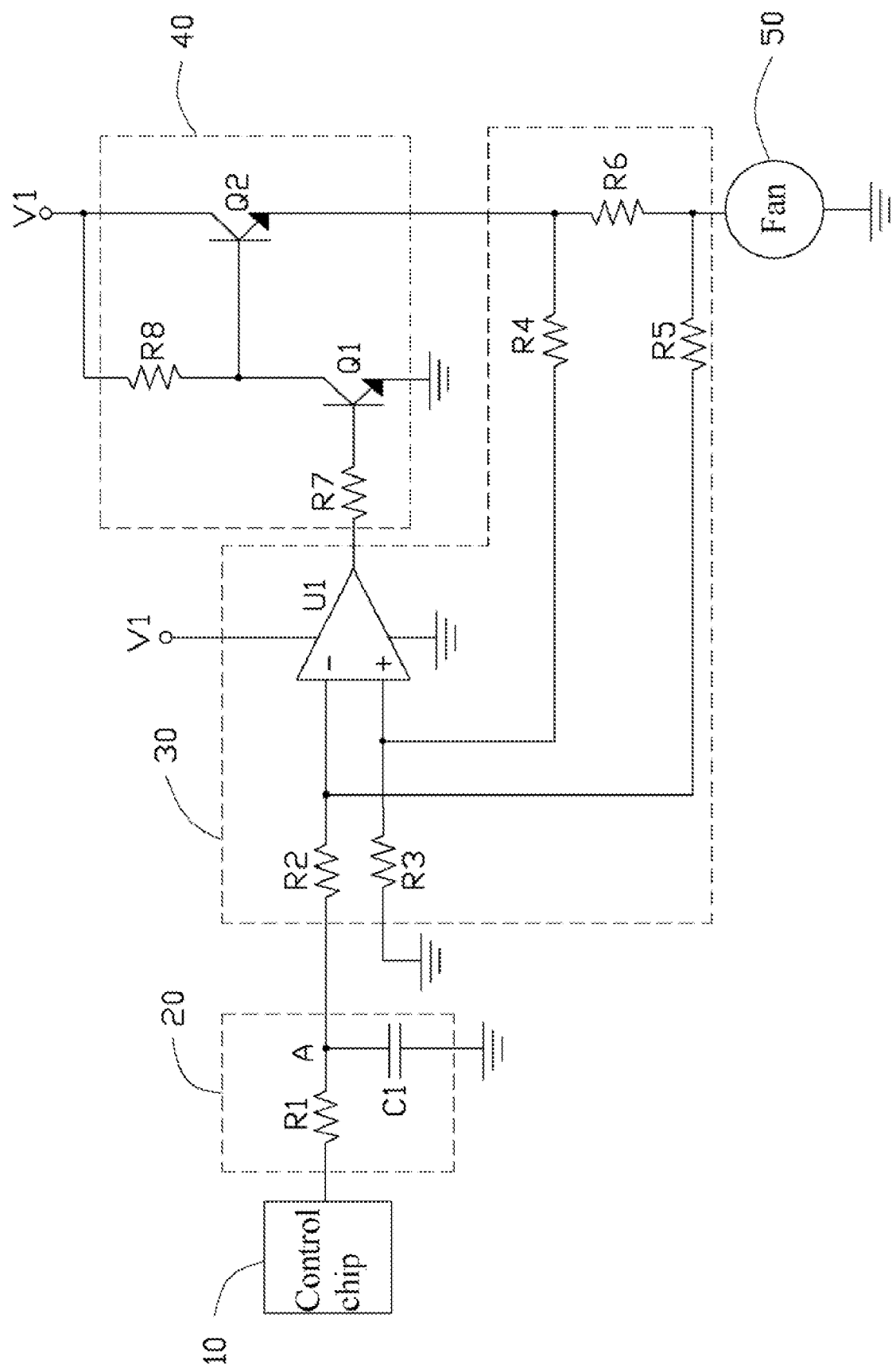

FAN CIRCUIT

BACKGROUND

1. Technical Field

The present disclosure relates to fans, and particularly to a fan circuit for controlling a speed of a fan.

2. Description of Related Art

Operation of electronic devices or components, such as central processing units (CPUs) may produce large amounts of heat. Generally, fans are used to remove the heat to keep the electronic devices working normally. A circuit to control the fan is required. However, the circuit may drive the fan to run at a substantially constant speed whether the electronic device is at a high temperature or at a low temperature. This is inefficient.

BRIEF DESCRIPTION OF THE DRAWING

The drawing is a circuit diagram of an exemplary embodiment of a fan circuit.

DETAILED DESCRIPTION

Referring to the drawing, an exemplary embodiment of a fan circuit for driving a fan 50 includes a control chip 10, an input circuit 20, an amplifier circuit 30, and a control circuit 40. The input circuit 20, the control circuit 40, and the fan 50 are all connected to the amplifier circuit 30. The control chip 10 is connected to the input circuit 20.

The control chip 10 outputs a discrete pulse width modulation (PWM) signal that changes with temperature of an electronic device to the input circuit 20. The input circuit 20 converts the PWM signal into a continual voltage signal provided to the amplifier circuit 30 according to a duty cycle of the PWM signal. If the temperature of the electronic device goes up, the duty cycle of the PWM signal becomes higher, the voltage signal is at higher level, and the fan 50 rotates faster. The amplifier circuit 30 amplifies the voltage signal to output a control signal. When the control signal is less than a threshold voltage (e.g., 0.6 volts), the control circuit 40 is turned on and the fan 50 receives current which is less than a preset current (e.g., 0.1 amperes). When the control signal is greater than the threshold voltage, the control circuit 40 is turned off and the fan 50 receives current which is greater than the preset current.

The input circuit 20 includes a resistor R1 and a capacitor C1. A first terminal of the resistor R1 is connected to the control chip 10. A second terminal of the resistor R1 is grounded via the capacitor C1, and is also connected to the amplifier circuit 30.

The amplifier circuit 30 includes an amplifier U1 and five resistors R2-R6. An inverting input terminal of the amplifier U1 is connected to a node A between the resistor R1 and the capacitor C1 via the resistor R2, and is also connected to an anode of the fan 50 via the resistor R5. A non-inverting input terminal of the amplifier U1 is grounded via the resistor R3, and is also connected to the control circuit 40 via the resistor R4. The resistor R6 is connected between the resistor R4 and the anode of the fan 50. A cathode of the fan 50 is grounded. A power terminal of the amplifier U1 is connected to a power supply V1. A ground terminal of the amplifier U1 is grounded. An output terminal of the amplifier U1 is connected to the control circuit 40. In this embodiment, the power supply V1 is a 12 volt (V) direct current (DC) power supply.

The control circuit 40 includes two transistors Q1 and Q2, and two resistors R7 and R8. A base of the transistor Q1 is connected to the output terminal of the amplifier U1 via the resistor R7. An emitter of the transistor Q1 is grounded. A collector of the transistor Q1 is connected to the power supply V1 via the resistor R8, and is also connected to a base of the transistor Q2. An emitter of the transistor Q2 is connected to a node between the resistors R4 and R6. A collector of the transistor Q2 is connected to the power supply V1. In this embodiment, the transistors Q1 and Q2, functioning as electronic switches, are npn transistors. In other embodiments, the transistors Q1 and Q2 can be other types of electronic switches, such as n-channel metal oxide semiconductor field effect transistors (NMOSFETs).

The following depicts how the fan circuit controls the speed of the fan 50. Suppose a voltage at the node A between the resistor R1 and the capacitor C1 is Ui, voltage at the non-inverting input terminal of the amplifier U1, which is equal to voltage at the inverting input terminal of the amplifier U1, is UA, voltage at the emitter of transistor Q2 is Uo, and voltage at the anode of the fan 50 is Uf, and resistances of the resistors R1-R6 are r1-r6, respectively. Because there is no current flowing through the inverting input terminal of the amplifier U1, current flowing through the resistor R5 is equal to current flowing through the resistor R2, the voltage Uf at the anode of the fan 50 is obtained from $$Uf = UA - (Ui - UA)*r5/r2 \tag{1}$$

Because current flowing through the resistor R4 is equal to current flowing through the resistor R3, the voltage Uo at the emitter of the transistor Q2 is obtained from $$Uo = UA + UA*r4/r3 \tag{2}$$

According to formulas (1) and (2), voltage between the resistor R6 is obtained from $$Uo - Uf = UA(1 + r4/r3) - [UA - (Ui - UA)*r5/r2] \tag{3}$$

$$\text{If } r4/r3 = r5/r2 = 1 \tag{4}$$

According to formulas (3) and (4), voltage between the resistor R6 is $$Uo - Uf = Ui \tag{5}$$

Current flowing through the resistor R6 is Ui/r6, and current flowing through the resistor R4 is equal to current flowing through the resistor R5 whose current direction is opposite to the current flowing through the resistor R4, so current flowing through the fan 50 is Ui/r6. A conclusion can be made that current flowing through the fan 50 is proportional to the voltage Ui at the node A. Therefore, the speed of the fan 50 can be controlled by varying the voltage Ui.

When the temperature of the electronic device is relatively low, such as 25 degrees Celsius, the control chip 10 outputs the PWM signal with a low duty cycle, such as 10%, the voltage Ui at the node A is at low level, such as 1.5V, and the speed of the fan 50 is low. When the temperature is high, such as 70 degrees Celsius, the PWM signal is output with a high duty cycle, such as 80%, the voltage Ui at the node A is at high level, such as 5V, the current flowing through the fan 50 is high, such as 0.3 A, and the speed of the fan 50 is fast.

The transistors Q1 and Q2 of the control circuit 40 ensure current still flows through the fan 50 when duty cycle of the PWM signal is relatively low (e.g., close to zero). When duty cycle of the PWM signal is relatively low (e.g., 1%), voltage at the inverting input terminal of the amplifier U1 is at low level (e.g., 0.5V), voltage output from the output terminal of the amplifier U1 is low, voltage at the base of the transistor Q1 is less than the threshold voltage (e.g., 0.6V), the transistor Q1 is turned off. The base of the transistor Q2 is at high level, the transistor Q2 is turned on. There is low current, less than preset current (e.g., 0.1 amperes), flowing through the fan 50 resulting in low fan speed. When the duty cycle of the PWM signal is high (70%), the voltage at the inverting input terminal of the amplifier U1 is high (4.6V), and the transistor Q1 is turned on. Voltage at the base of the transistor Q2 is extremely low and less than the threshold voltage, so the transistor Q2 is turned off. Current flowing through the fan 50 is high and is greater than the preset current resulting in higher speeds.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A fan circuit for driving a fan, the fan circuit comprising:
   a control chip to output a discrete pulse width modulation (PWM) signal changing with temperature;
   an input circuit connected to the control chip, to convert the PWM signal into a continual voltage signal;
   an amplifier circuit connected between the input circuit and the fan, to amplify the voltage signal and output a control signal, wherein the amplifier circuit comprises an amplifier, an inverting input terminal of the amplifier is connected to the input circuit via a first resistor, and is also connected to an anode of the fan via a second resistor, a non-inverting input terminal of the amplifier is grounded via a third resistor, and is also connected to a control circuit via a fourth resistor, and the ratio of resistances of the second resistor to the third resistor is equal to the ratio of resistances of the fourth resistor to the first resistor; and
   said control circuit is connected to the amplifier circuit, wherein when the control signal is less than a threshold voltage, the control circuit is turned on and the fan receives current which is less than preset current, when the control signal is greater than the threshold voltage, the control circuit is turned off and the fan receives current which is greater than the preset current.

2. The fan circuit of claim 1, wherein the input circuit comprises a resistor and a capacitor, a first terminal of the resistor is connected to the control chip, a second terminal of the resistor is grounded via the capacitor, and is also connected to the amplifier circuit.

3. The fan circuit of claim 1, wherein a fifth resistor is connected between the fourth resistor and the anode of the fan, a cathode of the fan is grounded, a power terminal of the amplifier is connected to a power supply, a ground terminal of the amplifier is grounded, an output terminal of the amplifier is connected to the control circuit.

4. The fan circuit of claim 3, wherein the control circuit comprises a first and a second electronic switches, a first terminal of the first electronic switch is connected to the output terminal of the amplifier via a sixth resistor, a second terminal of the electronic switch is grounded, a third terminal of the first electronic switch is connected to the power supply via a seventh resistor, and is also connected to a first terminal of the second electronic switch, a second terminal of the second electronic switch is connected to a node between the fourth and fifth resistors, a third terminal of the second electronic switch is connected to the power supply, wherein when the control signal is less than the threshold voltage, the first electronic switch is turned off, the second electronic switch is turned on, and the fan receives current which is less than the preset current, when the control signal is greater than the threshold voltage, the first electronic switch is turned on, the second electronic switch is turned off, and the fan receives current which is greater than the preset current.

5. The fan circuit of claim 4, wherein the first and second electronic switches are npn transistors, the first, second, and third terminals of the electronic switches are bases, collectors, and emitters of the npn transistors.

6. The fan circuit of claim 1, wherein the power supply is a 12 volt direct current power supply.

* * * * *